UNITED STATES PATENT OFFICE.

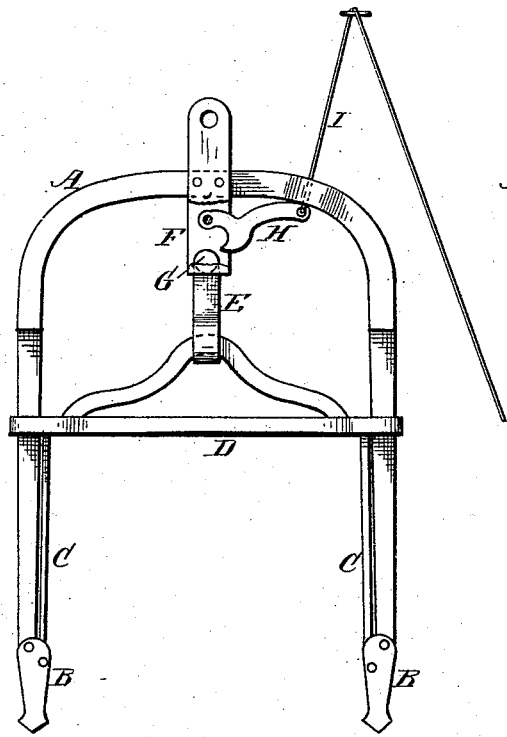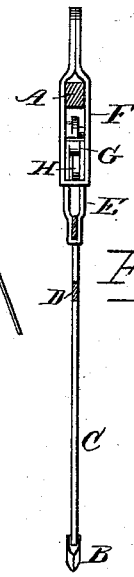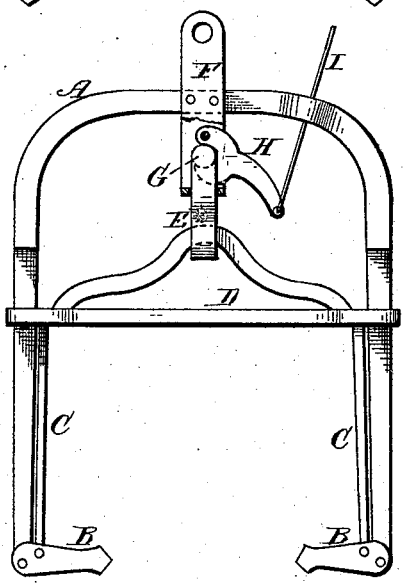

JACOB NEY, OF CANTON, OHIO.

HAY-FORK.

SPECIFICATION forming part of Letters Patent No. 261,562, dated July 25, 1882.

Application filed March 20, 1882. (No model.)

*To all whom it may concern:*

Be it known that I, JACOB NEY, a citizen of the United States, residing at Canton, in the county of Stark and State of Ohio, have invented certain new and useful Improvements in Hay-Forks; and I do hereby declare that the following is a full, clear, and exact description of the same, reference being had to the annexed drawings, making a part of this specification, and to the letters and figures of reference marked thereon.

This invention relates to certain improvements in forks for hay elevators and carriers; and it has for its objects to provide improved mechanism that will be automatically operated to secure the hay upon the tines when they are inserted in a body of the same and locked, so as to hold the hay while being conveyed to the place of deposit, and which may be disengaged when the hay has arrived at the place of deposit, so as to release the load and permit it to drop by its own weight from the tines. These objects I accomplish by the mechanism and devices illustrated in the accompanying drawings, in which—

Figure 1 represents an elevation of my improved fork with a portion cut away, showing the locking devices, the parts being in position to enable the tines to enter the hay. Fig. 2 shows a similar view with the parts in the position which they assume after having fully entered the body of hay so as to secure and hold it while being carried to the place of deposit, and Fig. 3 represents a transverse vertical sectional view with the parts in the same position as shown in Fig. 2.

In the drawings, A indicates the fork, having two straight tines, which hang in a vertical position when the fork is suspended from the elevating rope or chain of the carrier. The tines, at their extremities, are provided with short levers B, fulcrumed to such extremities, and formed with spear-pointed ends, so that they may readily enter a body of hay when in proper position. To these levers are pivoted the lower ends of the bars C, which are secured at their upper ends to a frame, D, which, at its ends, embraces the tines, and is adapted to slide vertically a short distance thereon. The frame, at its center, is provided with a vertical bifurcated extension, E, which passes up through an opening in the bottom of a short metallic frame, F, in which it is adapted to slide vertically. The upper end of the said bifurcated extension is provided with a short cylindrical connection, G, under which projects the end of a hooked tripping-lever, H, pivoted in the frame F when the frame D is elevated, so as to lock said frame and hold the parts in the position indicated in Figs. 2 and 3 of the drawings. The frame F is attached to the upper part of the fork in any convenient manner, and projects above it, forming a shank, which is provided with a suitable aperture, so that the fork may be conveniently attached to the elevating rope or chain.

The letter I indicates a rope or chain attached to one end of the hooked lever H, the said rope or chain passing through an aperture in the upper part of the fork, so as to serve as a means whereby the lever may be tripped, so as to release the parts and deliver the load at the point of deposit.

The operation of my invention is as follows: The parts are brought to a normal position, as indicated in Fig. 1 of the drawings, with the levers at the ends of the tines in direct line therewith. The fork is then inserted in the hay until the frame D begins to bear against the top of the same, which causes the frame E to move vertically upward, swinging the levers at the ends of the tines inward and upward until they assume positions at right angles, or nearly so, to the tines. When the frame is fully elevated the hooked lever H drops by its own weight into the position shown in Figs. 2 and 3 of the drawings, the curved portion engaging the extension on the upper part of the frame D, firmly locking the parts, so that the levers will firmly hold the hay upon the tines of the fork. The fork is then conveyed to the place of deposit, when by drawing upon the trip rope or chain the lever will release the sliding frame, permitting the parts, by the weight of the hay, to assume their normal position, so as to drop the load of hay.

Having thus fully described my invention, what I claim, and desire to secure by Letters Patent, is—

The hay-fork A, having pivoted to the extremities of its tines the levers B, with spear-pointed ends, and connected to the bars C, in combination with the vertically-sliding frame D, which embraces the tines of the fork at its ends to form guides, the bifurcated extension E, connection G, and the hooked lever H, pivoted to the frame F, and adapted to embrace the connection G upon its under side, substantially as and for the purpose set forth.

In testimony that I claim the above I have hereunto subscribed my name in the presence of two witnesses.

JACOB NEY.

Witnesses:
  FRED. W. BOND,
  AUGUST W. WEBER.